Figure 1:
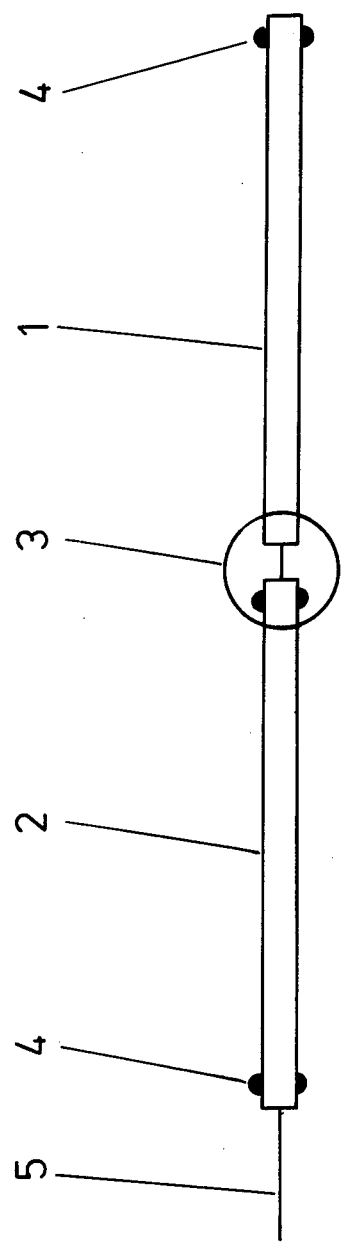

United States Patent [19]

MacGregor

[11] Patent Number: 4,869,591
[45] Date of Patent: Sep. 26, 1989

[54] METHOD OF OPTICALLY MEASURING RELATIVE ANGULAR MOVEMENT

[75] Inventor: Andrew D. MacGregor, Quebec, Canada

[73] Assignee: Coal Industry (Patents) limited, London, England

[21] Appl. No.: 217,859

[22] Filed: Jul. 12, 1988

[30] Foreign Application Priority Data

Aug. 13, 1987 [GB] United Kingdom ............... 8719154

[51] Int. Cl.⁴ ............................................ G01B 11/26
[52] U.S. Cl. .................................... 356/153; 356/138
[58] Field of Search .............. 356/153, 154, 138, 152, 356/110

[56] References Cited

U.S. PATENT DOCUMENTS 4,113,388 9/1978 Gates et al. ..................... 356/110
4,264,010 8/1988 Bachmann et al. ............... 356/154

Primary Examiner—Leon Scott, Jr.
Attorney, Agent, or Firm—James Creighton Wray

[57] ABSTRACT

Relative angular movement between two linear members is detected by shining light from a light source (11) through a triangular mask (12) in one member onto a mirror (10) in the other member and reflecting the image of the triangular mask onto a linear array of detectors (15). Movement between the two members causes different detectors in the array to be illuminated and the position and number of detectors illuminated determines the X and Y axis of movement to enable the relative angular movement of the two members to be calculated.

9 Claims, 3 Drawing Sheets

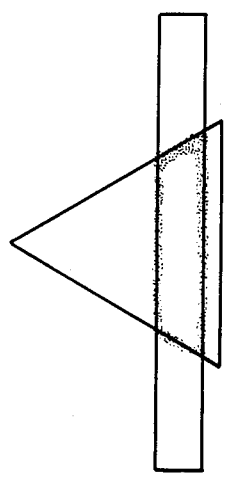
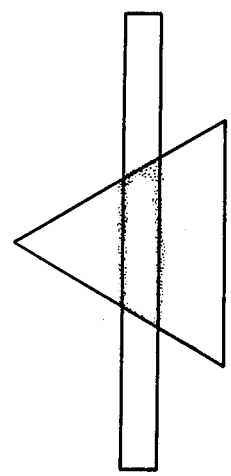
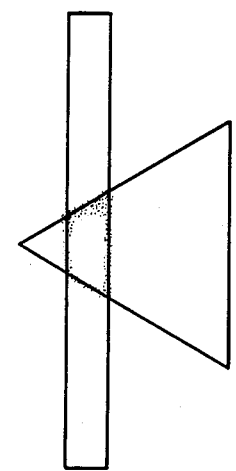
FIG. 3a  FIG. 3b  FIG. 3c
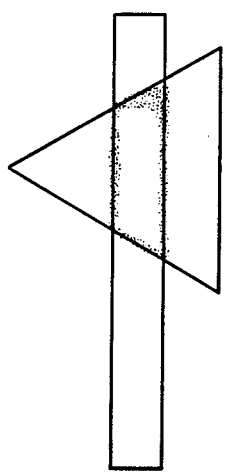
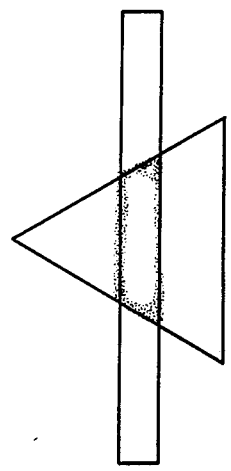
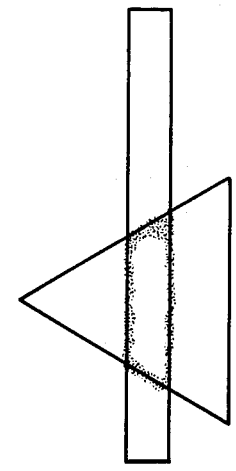
FIG. 3d  FIG. 3e  FIG. 3f

METHOD OF OPTICALLY MEASURING RELATIVE ANGULAR MOVEMENT

This invention relates to a method of optically measuring relative angular movment between two members and finds its particular application although not exclusive application in the measurement of the deviation of a long borehole drilled into strata from its desired position.

In many applications of quarrying and mining it is necessary to survey ahead of an area being excavated at any one time in order to ascertain likely problems which are to be encountered as quarrying and mining progresses. One way of doing this is to engage in long borehole drilling so that for example, in a coal seam, any geological faults may be detected well in advance of a mining machine reaching them. The borehole is drilled horizontally in the coal seam from a face or roadway and can extend for a distance of up to 1 km. It is generally intended that the borehole should be straight and not deviate but it is not always possible to control accurately the drill trajectory and some snaking can occur particularly if hard inclusions in the coal seam are hit by the cutting head. The borehole may thus be caused to curve.

Particularly for bits on rotating drill strings there is a tendency for the drill string to curve in one direction and the operator normally tries to correct this as the hole is being drilled. Once the borehole has been drilled it can then be surveyed by inserting various instruments into it and logging their outputs at various distances in the hole. In order to make sure that the information received from these instruments is accurately interpreted it is necessary to know the precise 3-dimensional trajectory of the hole. One way of doing this is to measure the local curvature of the hole at regular intervals, to reference each measurement to gravity, and then integrate the results over the length of the hole.

Existing borehole surveying instruments consist of stainless steel tubes which are of about two metres in length. The tubes contain a variety of instruments and measuring devices such as nucleonic devices for measuring the natural gamma radiation emitted by the strata, inclinometers for measuring the orientation of the probe with respect to gravity, and a magnetometer for determining the orientation of the probe with respect to the earth's magnetic field. The length of cable paid out may be measured by an odometer in order to determine the exact location of the instrument within the borehole. The magnetometer measurements have been the only means of determining the position of the hole in the horizontal plane (ie azimuth measurement) and these can be subject to significant errors due to time variations in the earth's magnetic field and magnetic anomalies in the strata. Such measurements can also be affected by the presence of magnetic metalwork nearby and therefore require the use of expensive non-magnetic materials in some of the drilling equipment. A non-magnetic means of azimuth measurement is via the 3-D trajectory determination using integrated radius of curvature measurements.

A method of measuring the local radius of curvature is to measure the angle between two stainless steel tubes, which may be up to about two metres in length each and are articulated to the adjacent tube by a joint of limited movement. This joint is conveniently of the ball and socket variety. The measurement is referenced to gravity by means of inclinometers.

A proposal has previously been made to determine this local curvature of the borehole by electro optical means on one section operating on a detector located in the adjacent section. The detector would be made up of a grid of charge coupled devices (CCD) which receive a pencil light beam from a source in the adjacent section and which when the two sections are in line and no curvature is occurring rests centrally on the array. As the device is moved into the borehole and the curvature is detected the beam is deflected over the array and different CCDs are excited. The output from the CCDs gives an indication in X and Y co-ordinates of the degree of deviation. This method is generally satisfactory except that misleading information can be obtained due to the beam being ill-defined at its edges giving varying outputs on some of the CCDs which are weakly excited.

It is an object of the present invention to give an improved method of optically measuring relative angular movement between two members and which is particularly applicable to measuring the deviation of long boreholes.

According to the present invention a method of optically measuring relative angular movement between two members comprises projecting from one of the members a beam of collimated light through a triangular mask onto a fixed linear array of detector elements on the second member to illuminate one or a plurality of the said detector elements, the number of detector elements illuminated indicating the relative angular deviation of the two members along a first axis of movement and the position of the elements illuminated in the array indicating the relative angular movement in the orthogonal axis.

The light source may be included on one of the members and projected directly onto the array in the other member. However it is preferable that one of the members contains all the active components and the other member contains only passive components and in this case the light source would be located in the member containing the active components and projected onto a mirror in the passive second member and reflected back onto the array in the first member.

The members are preferably joined by an articulated joint such as a ball joint and the mirror is incorporated within the ball joint.

The light source is preferably a light emitting diode (LED) and the source may be offset from the array and its light reflected onto the mirror of the second member through a partially reflecting mirror.

The array of CCDs may be arranged normally in one direction with an identified base of the triangle of the image projected by the mask parallel with the line of the array.

Figure 2:
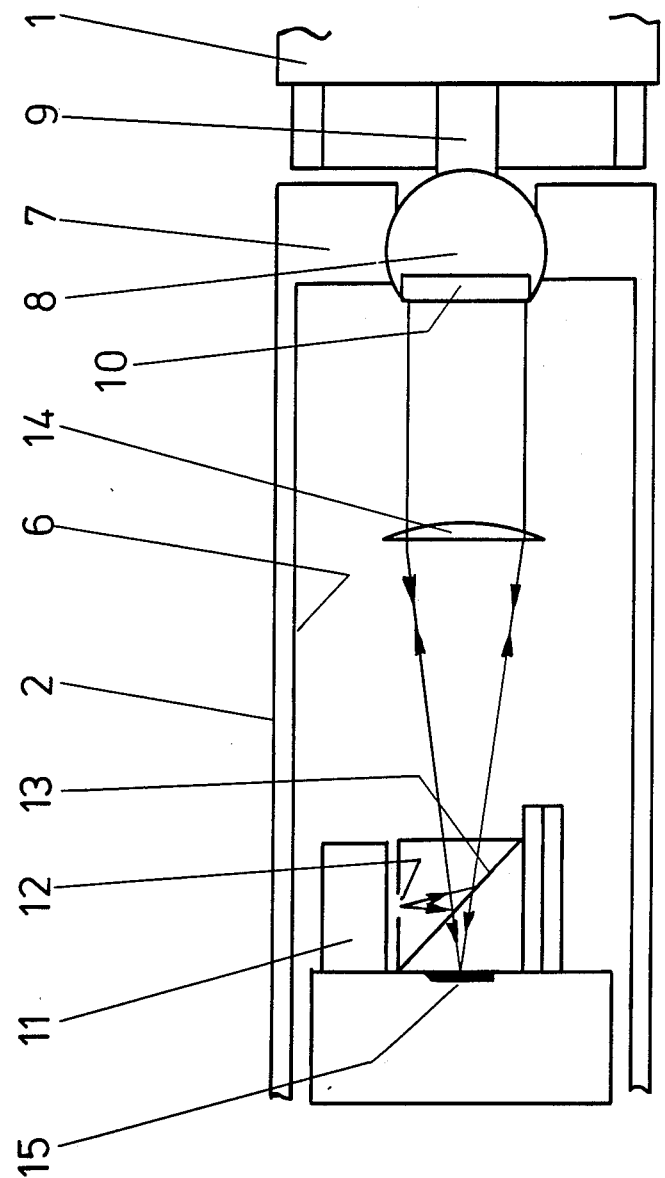

In order that the invention may be readily understood one example of a probe incorporating the method of the invention and as used with surveying equipment in a borehole of a coal seam will now be described with reference to the accompanying drawings. In FIG. 1 the probe is shown schematically. FIG. 2 is a section at the junction between the two sections of the probe shown in FIG. 1 and FIG. 3 indicates the principle of operation of the invention.

Referring first to FIG. 1, this shows a probe made up of a passive leading section 1 and an active trailing section 2 joined by an articulated joint 3. The sections each have centering members 4 which enable the sections to be centered within the borehole and to run smoothly within it. A cable 5 is paid out from a drum located at the coal face and connects with the trailing section as it advances and this cable transmits information from the active trailing section to the instrumentation located outside the face.

The sections 1 and 2 are made from stainless steel tube and the active trailing section 2 contains a number of elements including printed circuit boards incorporating voltage regulators, a power source and a light source and transducers for measuring roll-angle (or tool face angle) and inclination, all of which give information from which data relating to the borehole can be assessed.

Referring now to FIG. 2, this shows a section in the area of the articulated joint 3 as shown in FIG. 1. Only the extreme rear part of the leading section 1 is shown. The front end of the active section 2 is shown in section and as can be noted there is a tubular stainless steel wall 6 which has a blocked end 7 incorporated in an articulated ball joint shown generally as 8, the ball of which is connected to leading section 1 through a rigid stem 9. The construction and operation of the mechanical features of the ball joint are described and claimed in our co-pending British Patent Application No. 87/19155. The ball of the joint carries in a well in the ball a mirror 10 which is longitudinal to the axis of the section 2 and is centrally placed within the section 2. The mirror 10 receives light from an LED light source 11 which is collimated through a triangular mask 12 onto an inclined partially reflecting surface 13. Light from the surface 13 is channelled through a multielement lens system 14 to the mirror 10 and is reflected back through the multielement lens system 14 onto a CCD detector array 15 which is parallel with the mirror 10.

The linear array is made up of 1728 pixels (picture elements) arranged in a straight vertical line in its normal position and each pixel is of 10 μm. In this example the mask dimensions of the triangular mask are 14 mm triangular base with a 14 mm height to give a 53.13° apex angle. The triangular base is positioned so that it is parallel with the array of detectors. This is shown in FIG. 3 which indicates the principle of operation of the invention.

When the probe is in a straight length of borehole with no curvature the passive section 1 is directly in line with the active section 2. Light from the source is transmitted from the surface 13, through lens 14 onto the mirror 10 and back to the array 15 through surface 13 where it will illuminate a central number of pixels shown in FIGS. 3 (b) and 3 (e). If there is now movement of the section 1 relative to the section 2 in the horizontal axis to the left the illuminated image will be greater as shown in FIG. 3 (a) and a larger number of pixels in the center of the array will be excited. If the movement is to the right then there is lower number of pixels which are excited as is shown in FIG. 3 (c).

If movement between the two sections is in the vertical axis only then if the movement is upwards the area of the array 15 which is illuminated is towards the top of the array as shown in FIG. 3 (d). The same number of pixels will be illuminated as in FIG. 3 (e) it is merely their position which has altered. Similarly if the orthogonal or horizontal axis movement is down then the position of the illuminated pixels of the array is as shown in FIG. 3 (f).

It will be appreciated that normally there will be movement which is not wholly horizontal or wholly vertical and a vector movement will be recorded. By noting the number of pixels which are activated and the position of these pixels the vector position can be determined and from this the relative angular movement of the two sections determined. This movement which is co-ordinated with the distance logged by the odometer as the probe enters along the borehole enables the curvature to be accurately logged and calculations and corrections to be made accordingly for other information received from monitoring instruments in the active trailing section 2.

In this example the system resolution required of the pixel size was to an angular movement of 0.08 m rads. The pixel limited rms resolution is of the order of 0.02 m rads.

It will be appreciated that the invention enables an accurate calculation of the curvature of the borehole being measured to be obtained. The degree of accuracy is much greater than with previous methods and by virtue of its optical nature it is sensitive to very small movements in the relative position of the two sections whose angular differences are being measured.

I claim:

1. A method of optically measuring relative angular movement between two members the members including a light source, a triangular mask and a fixed linear array of detectors comprising the steps of projecting from one of the members a beam of collimated light through the triangular mask onto the fixed linear array of detector elements on the second member to illuminate one or a plurality of said detector elements, the number of detector elements illuminated indicating the relative angular deviation of the two members along a first axis of movement and the position of the elements illuminated in the array indicating the relative angular deviation of movement along an orthogonal axis.

2. A method as claimed in claim 1 wherein the light source is located on one member and is projected onto the array located on a second member.

3. A method as claimed in claim 1 wherein the light source and the detector array are both located within one member and a mirror located in the other member is arranged to reflect light from the light source onto the array.

4. A method as claimed in claim 3 wherein the joint is a ball and socket joint and the mirror is contained within the ball.

5. A method as claimed in claim 1 wherein the two members are joined by an articulated joint.

6. A method as claimed in claim 4 wherein the joint is a ball and socket joint and the ball is part of the second member.

7. A method as claimed in claim 1 wherein the source is a light emitting diode.

8. A method as claimed in claim 1 wherein the linear array of detectors in comprised of a plurality of individual charge coupled devices.

9. A method as claimed in claim 1 wherein the base of the image projected through the triangular mask is arranged parallel with the linear detector array.

* * * * *